United States Patent
Nurmi

(10) Patent No.: US 6,367,463 B1
(45) Date of Patent: Apr. 9, 2002

(54) ADVANCED ANTIPOLISHING RING ARRANGEMENT

(75) Inventor: Hannu Nurmi, Vaasa (FI)

(73) Assignee: Wartsila NSD OY AB, Helsinki (FI)

( * ) Notice: Subject to any disclaimer, the term of this patent is extended or adjusted under 35 U.S.C. 154(b) by 0 days.

(21) Appl. No.: 09/587,494

(22) Filed: Jun. 2, 2000

(30) Foreign Application Priority Data

Jun. 4, 1999 (FI) .................................................. 99 01282

(51) Int. Cl.$^7$ ................................................ F02B 75/08
(52) U.S. Cl. ..................................... 123/668; 123/193.2
(58) Field of Search ......................... 123/193.2, 193.4, 123/668, 193.6, 193.1

(56) References Cited

U.S. PATENT DOCUMENTS

| | | | | |
|---|---|---|---|---|
| 2,624,328 A | | 1/1953 | Grinham et al. | |
| 3,620,137 A | * | 11/1971 | Prase | 123/193.2 |
| 3,800,751 A | * | 4/1974 | Glassey et al. | 123/193.2 |
| 4,399,783 A | * | 8/1983 | Hauser, Jr. | 123/193 CH |
| 4,462,343 A | | 7/1984 | Eckert | |
| 4,474,147 A | * | 10/1984 | Hoopes | 123/193 CP |
| 6,164,260 A | * | 12/2000 | Bock | 123/193.2 |

FOREIGN PATENT DOCUMENTS

GB     2 009 884     6/1979

* cited by examiner

*Primary Examiner*—Bibhu Mohanty
(74) *Attorney, Agent, or Firm*—John Smith-Hill; Smith-Hill and Bedell

(57) ABSTRACT

An antipolishing ring arrangement utilized in a cylinder of a large combustion engine, which arrangement is supported on a cylinder sleeve, comprises at least two separate ring elements which are disposed one after the other in the axial direction of the cylinder sleeve.

12 Claims, 2 Drawing Sheets

ADVANCED ANTIPOLISHING RING ARRANGEMENT

BACKGROUND OF THE INVENTION

This invention relates to an antipolishing ring arrangement utilized in a cylinder of a large combustion engine, particularly a large diesel engine, which arrangement is supported on a cylinder sleeve.

In this context the expression large diesel engine means such engines as may be employed as, for example, main or auxiliary engines of a ship or which are suitable for production of heat and/or electricity.

An antipolishing ring is commonly used in a cylinder sleeve of a large combustion engine, specifically a diesel engine or a so-called gas engine, in which gaseous fuel, for example natural gas, is utilized as the main fuel, for removing deposit that may accumulate on the top land of the piston. In this way, wearing of the cylinder sleeve and consumption of lubricating oil may be decreased. The antipolishing ring is usually made of one element, whereupon if the top land of the piston or a part of the cylinder above the piston is relatively long in the axial direction of the cylinder sleeve, the antipolishing ring will correspondingly be relatively long. In this case, it is difficult to manufacture a thin ring with sufficient dimensional accuracy. In addition, it is difficult to install a thin ring, because mounting clearance is small.

Different parts of an antipolishing ring are influenced by different circumstances, whereby the ring may have also different kinds of other functions. The lower part of the ring, or outermost part relative to the combustion chamber of the cylinder (assuming that the cylinder is oriented with the combustion chamber above the piston), is usually colder and its purpose is to scrape off deposit accumulating on the top land of the piston, whereby wearing durability is needed. The upper part of the ring in turn is exposed to great heat load and heat corrosion load, whereby its heat expansion is greater than that of the lower part of the ring. Hence the upper part of the ring may accumulate a lot of deposit, which may come loose and accumulate on sliding surfaces of the cylinder. Further, thermal insulation of the combustion chamber of the cylinder, particularly in power plant engines, tends to increase operating temperature and assists with achieving greater efficiency. Thus, the upper part of the ring may be utilized also as heat insulating element. This results in that the material demands at the upper and lower parts of the ring may by considerably different.

A solution to the problems mentioned above is shown in publication FI 95830, corresponding to U.S. Pat. No. 5,553,585. The solution is based on arrangements which allow the lower part of the ring to be bent or deflected towards the top land of the piston at normal operating speed and load of the engine or when it is totally warmed up. These arrangements make construction of the antipolishing ring rather complicated and thus rather expensive for manufacture.

It is an object of the invention to provide a new and improved antipolishing ring arrangement, in which the above mentioned drawbacks are substantially eliminated. It is an object that the arrangement be of simple construction and durable, well suited to requirements set by different operating conditions and easy to mount.

SUMMARY OF THE INVENTION

According to the invention the antipolishing ring arrangement comprises at least two separate ring elements, which are arranged one after the other in the axial direction of the cylinder sleeve. It is then possible to select the properties of each ring element independently and without separate additional arrangements, so that the properties of the ring element correspond as closely as possible to the requirements imposed by external operation circumstances of the ring elements.

For convenience in the following, the ring element that is nearer the combustion chamber will be referred to as the first ring element and the ring element that is adjacent the first ring element will be referred to as the second ring element. The invention will be described in detail with reference to an antipolishing ring arrangement consisting of two ring elements, but naturally an antipolishing ring arrangement in accordance with the invention may have more than two ring elements.

The internal diameter of the first ring element, which is closer to the combustion chamber of the cylinder, is preferably smaller than that of the second ring element when the ring elements are cold. Then the first ring element, which is exposed to a higher temperature than the second ring element, may if desired be designed so that it expands to such an extent that at the operating temperature of the engine, the internal diameters of the first and second rings are substantially equal. This ensures that no more deposit can accumulate in proximity of the first ring element than in proximity of the second ring element.

The ring elements are preferably also of different respective materials. Thus, the material of the first ring element, which is closer to the combustion chamber of the cylinder, is preferably selected so that its coefficient of thermal expansion is less than that of the material of the second ring element. This limits the thermal expansion of the first ring element so that the clearance between the first ring element and the mantle surface of the piston is not too large at the operating temperature of the engine.

The first ring element is preferably made of a heat resistant, heat corrosion durable or heat insulating material, for example martensitic stainless steel. The second ring element is preferably made from wear resistant material, for example hard cast iron. Particularly materials comprising large amount of carbides are suitable for this purpose.

Preferably, the inner surface of the first ring element is formed with an array of recesses such as grooves, notches or the like, in which the deposit that has been scraped from the mantle surface of the piston by the antipolishing ring may accumulate. In this case the accumulated deposit is retained in the recesses and does not come loose as easily as if the inner surface were smooth. The deposit that is retained in the recesses functions as a heat insulating element and allows increased temperatures to be achieved in the combustion chamber.

Further, the ring elements are preferably symmetrical so that they are turnable to be mounted upside down. Specifically, the second ring element may be easily turned upside down without clearance problems, whereupon its service life may in practice be doubled. In respect of the first ring element the clearance problems may be avoided by proper material selection, so that considering the circumstances the heat expansion is as small as possible. By this way the turning upside down may be accomplished also in this case and thus extend the service life of the first ring element.

BRIEF DESCRIPTION OF THE DRAWINGS

In the following, the invention is described, by way of example, with reference to the attached drawings, in which.

DETAILED DESCRIPTION

Figure 1:
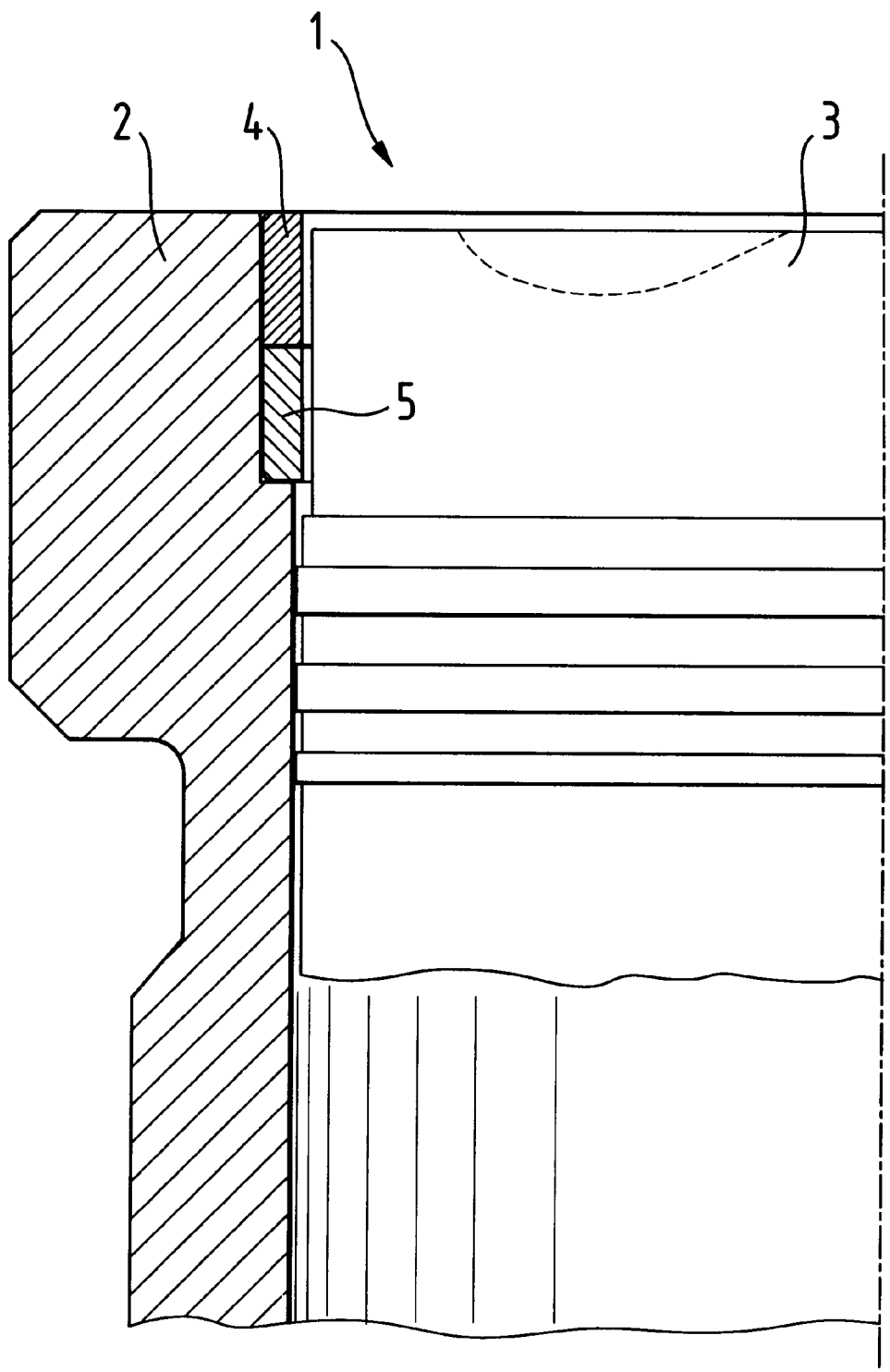
FIG. 1 shows an antipolishing ring arrangement according to the invention as an elevation in axial direction of the cylinder sleeve.

In the drawing, 1 indicates a cylinder of a large combustion engine having a cylinder sleeve or liner 2, inside of which a piston 3 is arranged to reciprocate. The cylinder sleeve 2 is provided with an antipolishing ring arrangement, which comprises two separate ring elements 4 and 5. These form a small step, the purpose of which is to remove deposit possibly accumulating on the upper part or top land of the piston during operation of the engine.

In the embodiment of FIG. 1, the ring elements 4 and 5 are essentially the same diameter. Due to the upper or first ring element 4 being closer to the combustion chamber, which is located above the piston 3, and being thus exposed to higher temperatures, it may be made from a material having a smaller coefficient of thermal expansion than that of the lower or second ring element 5. This way the different external circumstances may be compensated so that formation and removal of deposit correspond better to each other in different parts of the ring elements and the piston 3.

Figure 2:
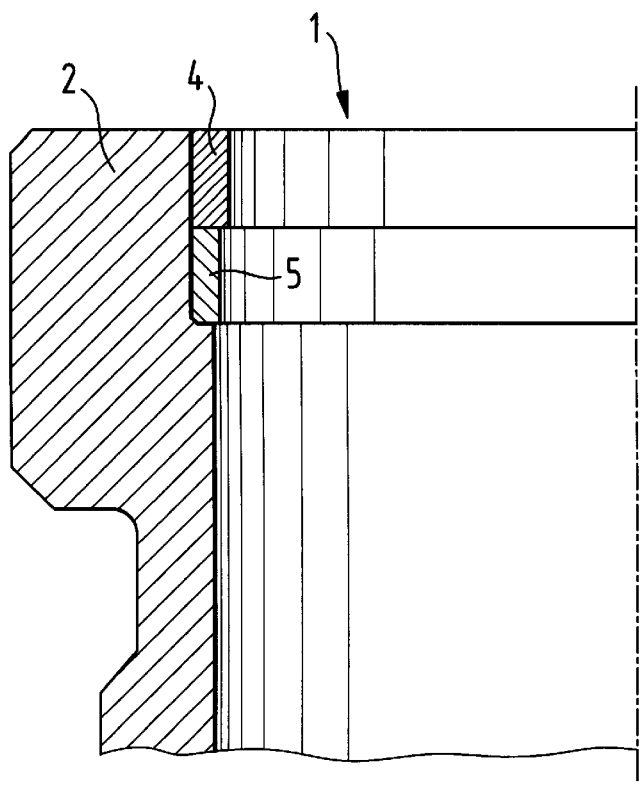
FIG. 2 shows another antipolishing ring arrangement according to the invention as an elevation in axial direction of the cylinder sleeve.

FIG. 2 illustrates the situation when the engine is cold and the first ring element is of smaller internal diameter than the second ring element. The greater heat load of the first ring element 4 results in greater expansion of the first ring element so that at the operating temperature its inner diameter may, if desired, be equal to that of the second ring element 5. Naturally, the ring elements may be designed, both with respect to dimension and materials, so that they are of different internal diameters at the operating temperature.

Figure 3:
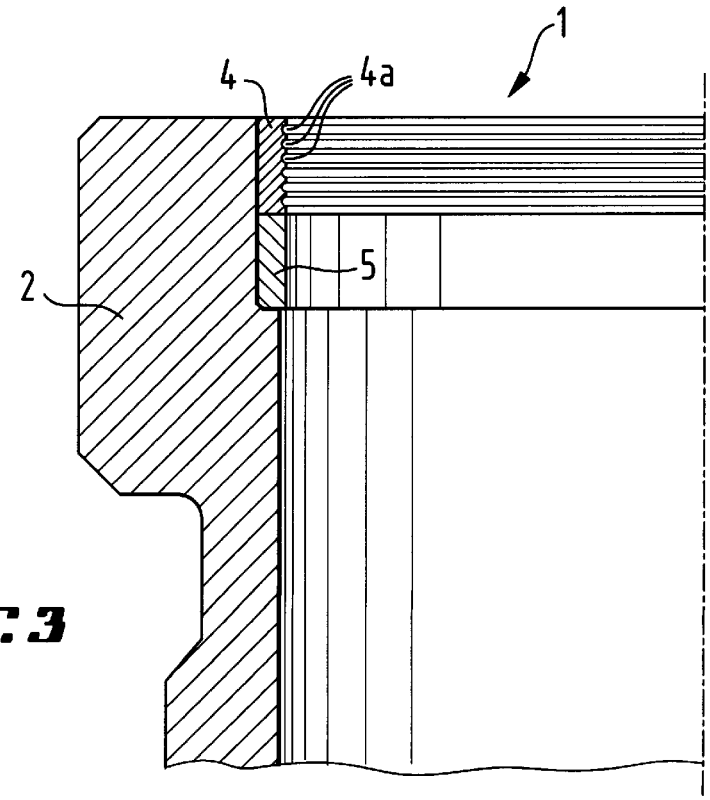
FIG. 3 shows a third antipolishing ring arrangement according to the invention as an elevation in axial direction of the cylinder sleeve.

In the embodiment of FIG. 3, the inner surface of the first ring element 4 is formed with an array of grooves 4a. The purpose of the grooves is to accumulate the deposit, which is more successful in case the grooves are sharp edged. Otherwise the form, position, size and location of the grooves 4a may vary, and also notches or other suitable recesses may be utilized for the purpose. The accumulated deposit functions in turn as a heat-insulating element, which lends itself to assist possible objectives of increasing the temperature of combustion process.

The ring elements 4 and 5 are made preferably to be symmetrical in all shown embodiments, whereupon depending on wearing they may be turned upside down in case of need and thus extend their service life.

Specifically in the case that the top land of the piston is longer than usual in axial direction of the cylinder, such as is typically the case in a large two-stroke diesel engine, there may also be provided more than two ring elements.

The invention is not restricted to the embodiments shown, but several modifications are feasible within the scope of the attached claims.

What is claimed is:

1. An antipolishing ring arrangement utilized in a cylinder of a large combustion engine, which arrangement is supported on a cylinder sleeve having a central axis and comprises at least two separate ring elements which are disposed adjacent one another along the central axis of the cylinder sleeve.

2. An antipolishing ring arrangement according to claim 1, comprising a first ring element and a second ring element and wherein the first ring element is closer to the combustion chamber of the cylinder than is the second ring element and the inner diameter of the first ring element is smaller than that of the second ring element.

3. An antipolishing ring arrangement according to claim 1, wherein the ring elements are of different respective materials.

4. An antipolishing ring arrangement according to claim 1, comprising a first ring element and a second ring element and wherein the first ring element is closer to the combustion chamber of the cylinder than is the second ring element and the material of the first ring element has a smaller coefficient of thermal expansion than that of the second ring element.

5. An antipolishing ring arrangement according to claim 1, comprising a first ring element and a second ring element and wherein the first ring element is closer to the combustion chamber of the cylinder than is the second ring element and the first ring element is made of heat resistant, heat corrosion durable or heat insulating material.

6. An antipolishing ring arrangement according to claim 5, wherein the first ring element is made of martensitic stainless steel.

7. An antipolishing ring arrangement according to claim 1, wherein the second ring element is made of wear resistant material.

8. An antipolishing ring arrangement according to claim 7, wherein the second ring element is made of hard cast iron.

9. An antipolishing ring arrangement according to claim 1, comprising a first ring element and a second ring element and wherein the first ring element is closer to the combustion chamber of the cylinder than is the second ring element and the inner surface of the first ring element is formed with an array of recesses.

10. An antipolishing ring arrangement according to claim 9, wherein the recesses are grooves or notches.

11. An antipolishing ring arrangement according to claim 1, wherein one of the ring elements is symmetrical about a plane perpendicular to the central axis of the cylinder sleeve so that the ring element can be turned and mounted upside down.

12. An antipolishing ring arrangement according to claim 1, wherein each of the ring elements is symmetrical about a plane perpendicular to the central axis of the cylinder sleeve so that each ring element can be turned and mounted upside down.

\* \* \* \* \*